United States Patent Office 3,538,182
Patented Nov. 3, 1970

3,538,182
ISOMERIZATION OF NEOHEXENE TO 2,3-DI-METHYLBUTENES WITH A MIXTURE OF ALUMINA AND MINERAL OIL
Samuel Kahn, Rutherford, N.J., assignor to Universal Oil Products Company, Des Plaines, Ill., a corporation of Delaware
No Drawing. Continuation-in-part of application Ser. No. 583,961, Oct. 3, 1966. This application Dec. 27, 1968, Ser. No. 787,598
Int. Cl. C07c 5/24
U.S. Cl. 260—683.2        3 Claims

ABSTRACT OF THE DISCLOSURE

Preparation of 2,3-dimethylbutenes by isomerizing neohexene in the presence of a catalyst system containing an inert fluid having a boiling point above about the isomerization temperature and alumina as the sole active isomerization catalyst.

CROSS REFERENCE TO RELATED APPLICATIONS

This is a continuation-in-part of copending application Ser. No. 583,961 filed Oct. 3, 1966, now abandoned.

DESCRIPTION OF THE INVENTION

This invention relates to a process for the preparation of 2,3-dimethylbutenes and, more particularly, to a process for preparing such butenes by the skeletal isomerization of neohexene using a novel catalyst system.

Butenes such as 2,3-dimethylbutene-1 and 2 are valuable industrial chemicals having many uses such as, for example, in preparing synthetic rubbers or increasing octane ratings for gasoline. They are produced by various reactions such as, for example, the catalytic or thermal dehydrohalogenation of neohexyl halides. These processes are usually not industrially desirable, however, because of the high costs involved. A far more desirable manner of preparation would be to use neohexene as starting material and rearranging it by skeletal isomerization to the desired 2,3-dimethylbutene. Isomerizations, however, and particularly catalytic isomerizations, are frequently difficult to carry out and are usually characterized by low conversions and yields and substantial destruction of the isomerate through other side reactions such as cracking or polymerization. It has now been discovered that the catalyst, skeletal isomerization of neohexane to 2,3-dimethylbutenes may be readily and simply effected with high conversions and yields by using a novel catalyst system comprising a mixture of an inert high boiling fluid and alumina as the sole active isomerization catalyst.

Accordingly, an object of this invention is to provide a process for preparing 2,3-dimethylbutenes. Another object is to provide a process for preparing these butenes by effecting the skeletal isomerization of neohexene using a novel catalyst system whereby the product is readily and easily obtained with high conversion and yield and with negligible destruction of the neohexene in by-product formation. These and other objects of this invention will be apparent from the following further detailed description thereof.

The catalyst system which is used according to this invention to effect the continuous skeletal isomerization of neohexene to 2,3-dimethylbutenes comprises a mixture or suspension of an alumina isomerization catalyst and an inert, high boiling fluid. This fluid is of critical importance to the success of the catalyst system in effecting the desired isomerization and it is essential that it be substantially inert to the neohexene charge and the dimethylbutene product and that it has a boiling point above about the isomerization temperature used. Of the various normally liquid materials having these two essential characteristics, as well as a desirable viscosity range, highly preferred materials for use in the catalyst system of this invention comprise mineral oils having atmospheric or normal boiling point ranges of from above about 300° initial to 450° C. end and, more preferably, above about 350° initial to 500° C. end.

It is an essential feature of the present invention that the isomerization catalyst used in the catalyst system is alumina as the sole active catalyst. Contrary to the teachings in the prior art, it has been found that the use of alumina as the sole active catalyst results in high yields of the desired 2,3-dimethylbutenes. A highly preferred catalyst for the system, especially when the fluid is a high boiling mineral oil, comprises a substantially pure alumina, for example, an alumina having at least above about 95 percent by weight as either beta-trihydrate alumina or eta alumina or a combination of both with the remainder being primarily gamma alumina. The catalyst should preferably be in a finely divided state so as to have a suitably large surface contacting area and catalysts having, for example, a screen analysis of 35 percent through 200 mesh and 2 percent on 40 mesh usually are suitable.

The ratio of the fluid to catalyst in the catalyst system is not critical and may be widely varied. Generally, however, the ratio should at least be sufficient to provide a readily stirrable mixture with the particular minimum ratio to this purpose being dependent upon such factors as the particular catalyst particle size and the particular fluid used. For example, when using a fluid such as a mineral oil and the substantially pure alumina catalyst, the ratio of fluid to catalyst should be above about one weight part of fluid per one weight part of catalyst with a more preferred ratio being above about 3 to 1 or about 5 to 1 weight parts of fluid to catalyst, respectively. The upper limit of the ratio of fluid to catalyst is not too important. However, having high ratios of fluid to catalyst does not necessarily improve the results of the process and primarily serves only to increase the volume of the catalyst system, thus raising the overall process cost. Typically, a satisfactory upper limit for the ratio is about 7.5 weight parts of fluid per one weight part of catalyst.

The amount of the catalyst system used in the process will be primarily determined by the amount of alumina catalyst present in the catalyst system and the particular ratio of fluid to catalyst chosen for the system. The amount of catalyst present in the system, in turn, will be dependent upon such variable factors as the charge rate of the neohexene, the temperature and the degree of conversion desired. For example, when using a substantially pure alumina catalyst and a mineral oil as the fluid in the catalyst system, a quantity of catalyst proportional to a range of from about 0.1 to 5 weight parts of catalyst per one weight part of the neohexene charge per hour will be satisfactory for most operating conditions.

The isomerization conditions of temperatures and pressure used to effect the isomerization are not critical and may be widely varied, with the optimum isomerization temperature for maximizing yield and conversion being dependent upon such factors as the particular catalyst system used and the charge rate of the neohexene. Generally, the temperature will be within the range of from about 200° to 300° C., with a more limited range of about 220° to 275° C. being preferred. The use of temperatures below 300° C. offers the advantage of avoiding cracking and other undesired reactions which are experienced in the higher temperature vapor phase isomerization processes. The pressure used in association with the above temperature ranges may be varied but, conveniently, atmospheric pressure may be suitably utilized in most instances. The rate at which the neohexene is contacted with the catalyst system may be varied and the particular rate chosen to optimize the conversion will depend upon such factors as the temperature, the particular catalyst system, its volume and the quantity of isomerization catalyst present in the system. For example, when using the alumina catalyst and a mineral oil in the catalyst system, a neohexene charge rate ranging from about 0.5 to 10 pounds per hour per pound of catalyst in the system will usually be satisfactory.

One illustrative procedure for carrying out the process of this invention for preparing 2,3-dimethylbutenes comprises continuously charging, at an appropriate rate, neohexene, to a suitable reactor maintained at the desired temperature and pressure and containing the catalyst system, comprising a stirred mixture of alumina catalyst and an inert, high boiling fluid such as a mineral oil which are maintained in the desired weight ratio. The gaseous product effluent is continuously withdrawn from the reactor and passed to a condenser maintained at a suitable temperature. The liquid fraction from the condenser composed primarily of unconverted neohexene and 2,3-dimethylbutenes is charged to a suitable fractionator to separate the desired 2,3-dimethylbutenes from the neohexene. Because the catalyst system is so highly selective in forming the desired product without the formation of substantial quantities of by-product, the recovered neohexene may be recycled as charge without further purification. The recovered 2,3-dimethylbutenes usually exists as a mixture of the 1 and 2 isomers which may, if desired, be separated into pure isomer fractions by conventional techniques including fractionation.

The following example is offered to illustrate the process of this invention and the catalyst system therefor.

Example I

The isomerization of neohexene to produce 2,3-dimethylbutenes was effected according to the process and the catalyst system of this intention according to the following procedure:

A glass-lined reactor equipped with mixing and heating means and overhead with a condenser was filled with a catalyst system comprising 1000 grams of a colorless mineral oil having an atmospheric boiling range of 367° C. start and 500° C. end and 200 grams of a finely divided, substantially pure alumina containing at least 95 percent by weight as beta-trihydrate alumina or eta alumina with the remainder being primarily gamma alumina. With stirring, the catalyst system was heated to a temperature of about 245° to 250° C. A stream of neohexene (99% pure) was then charged to the reactor at a rate of about 3.2 grams per minute. The gaseous effluent from the reactor was condensed in the condenser and the liquid product was collected. About 500 grams of neohexene were charged during the run and about 482.5 grams of liquid product were collected. Analysis of the liquid product by gas liquid chromatography indicated the following weight percentage composition:

2,3-dimethylbutene-1 _____ 19.8
2,3-dimethylbutene-2 _____ 28.4
Neohexene _____ 52.0
By-products _____ Negligible The conversion to 2,3-dimethylbutenes accordingly was 46.5 percent of theory and the yield based upon consumed neohexene was 96.5 percent of theory.

I claim as my invention:

1. A process for the preparation of 2,3-dimethylbutenes which comprises isomerizing neohexene at a temperature of from about 200° to about 300° C. in the presence fo a mixture of (1) a mineral oil having an atmospheric boiling point above about 300° C. and (2) substantially pure alumina as the sole active isomerization catalyst, said alumina consisting essentially of an alumina selected from the group consisting of beta-trihydrate alumina, eta alumina and mixtures thereof, and the weight ratio of oil to alumina being above about 1:1 to about 7.5:1.

2. The process of claim 1 further characterized in that the mineral oil has a boiling range above about 350° C. and is in a weight ratio to said catalyst of above about 3 to 1.

3. The process of claim 1 further characterized in that the isomerization temperature is within the range of from about 225° to about 275° C.

References Cited

UNITED STATES PATENTS

| 2,301,342 | 11/1942 | Sumerford et al. ___ 260—683.2 |
| 2,395,274 | 2/1946 | Hillyer et al. _____ 260—683.2 |
| 2,397,085 | 3/1946 | Boedeker et al. ___ 260—683.65 |
| 2,400,795 | 5/1946 | Watson _____ 260—683.2 |
| 2,452,121 | 10/1948 | Grahame _____ 260—683.65 |

OTHER REFERENCES

Wilson, E. "Isomerization of Hydrocarbons," Chemical Reviews, vol. 21, 1937, pp. 145–148.

DELBERT E. GANTZ, Primary Examiner

G. J. CRASANAKIS, Assistant Examiner

U.S. Cl. X.R.

260—683.65